(12) United States Patent
Stapleton et al.

(10) Patent No.: US 9,797,306 B1
(45) Date of Patent: Oct. 24, 2017

(54) PORTABLE GENERATOR

(71) Applicants: Jeff Stapleton, Royse City, TX (US); John Dunlap, Royse City, TX (US)

(72) Inventors: Jeff Stapleton, Royse City, TX (US); John Dunlap, Royse City, TX (US)

( * ) Notice: Subject to any disclaimer, the term of this patent is extended or adjusted under 35 U.S.C. 154(b) by 0 days.

(21) Appl. No.: 15/162,993

(22) Filed: May 24, 2016

(51) Int. Cl.
| | |
|---|---|
| *B60L 11/12* | (2006.01) |
| *H02P 9/04* | (2006.01) |
| *F02B 63/04* | (2006.01) |
| *H02K 7/18* | (2006.01) |
| *F02N 11/12* | (2006.01) |

(52) U.S. Cl.
CPC ............ *F02B 63/048* (2013.01); *F02N 11/12* (2013.01); *H02K 7/1815* (2013.01)

(58) Field of Classification Search
USPC .......................................................... 290/50
See application file for complete search history.

(56) References Cited

U.S. PATENT DOCUMENTS

| | | | |
|---|---|---|---|
| 6,310,404 B1 | 10/2001 | Frank | |
| 7,161,253 B2 * | 1/2007 | Sodemann | F02N 11/12 290/1 A |
| 7,475,888 B2 * | 1/2009 | Craig | F02B 63/04 280/47.18 |
| D597,944 S | 8/2009 | Takamura | |
| 7,597,340 B2 * | 10/2009 | Hirose | B62B 5/0006 16/110.1 |
| 7,896,368 B2 | 3/2011 | Craig | |
| 8,302,976 B2 | 11/2012 | Okabe | |
| 8,328,207 B2 * | 12/2012 | Hirose | F02B 63/04 280/47.131 |
| 9,397,513 B2 * | 7/2016 | Butler | H02J 7/0054 |
| 9,457,822 B2 * | 10/2016 | Rumao | B62B 1/008 |
| 2004/0012204 A1 * | 1/2004 | Walter | F02N 11/06 290/36 R |
| 2009/0228149 A1 * | 9/2009 | Alston | F04B 35/00 700/276 |
| 2009/0284022 A1 * | 11/2009 | Usselman | F02D 29/06 290/38 R |
| 2009/0322046 A1 * | 12/2009 | Hirose | F02B 63/04 280/47.371 |
| 2011/0095540 A1 | 4/2011 | Jackson | |
| 2014/0159509 A1 * | 6/2014 | Inskeep | H02J 7/0063 307/150 |
| 2014/0217689 A1 | 8/2014 | Rumao | |

(Continued)

FOREIGN PATENT DOCUMENTS

CN 2916311 Y 6/2007

*Primary Examiner* — Pedro J Cuevas
(74) *Attorney, Agent, or Firm* — Kyle A. Fletcher, Esq.

(57) ABSTRACT

The portable generator is a portable electricity provisioning system that is adapted for use in generating electricity. The portable electricity provisioning system is mounted on a wheeled structure that allows the portable generator to be readily transported to locations where electricity is otherwise not available or is not adequate for the intended use. The portable generator is configured to provide electricity at 120 Vac, 12 Vdc and 5 Vdc and further comprises adequate energy reserves and connections to provide 625 amps at 12 Vdc for use in starting vehicles in maintenance situations. The portable generator comprises an inverter, a jump starting system, a plurality of ports, and a dolly.

12 Claims, 4 Drawing Sheets

(56) References Cited

U.S. PATENT DOCUMENTS

| | | | |
|---|---|---|---|
| 2014/0277791 A1* | 9/2014 | Lenard | B60K 6/20 700/287 |
| 2016/0049819 A1* | 2/2016 | Butler | H02J 7/0054 320/105 |
| 2016/0285295 A1* | 9/2016 | Marinov | H05K 7/20909 |
| 2016/0297311 A1* | 10/2016 | Butler | H02J 7/0054 |

* cited by examiner

PORTABLE GENERATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of combustion engines in general, more specifically, a portable structure upon which an internal combustion engine adapted to drive an electric generator and the associated electric generator is mounted.

SUMMARY OF INVENTION

The portable generator is a portable electricity provisioning system that is adapted for use in generating electricity. The portable electricity provisioning system is mounted on a wheeled structure that allows the portable generator to be readily transported to locations where electricity is otherwise not available or is not adequate for the intended use. The portable generator is configured to provide electricity at 120 Vac, 12 Vdc and 5 Vdc and further comprises adequate energy reserves and connections to provide at least 625 amps at 12 Vdc for use in starting vehicles in maintenance situations.

These together with additional objects, features and advantages of the portable generator will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable generator in detail, it is to be understood that the portable generator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable generator.

It is therefore important that the claims be regarded as including such equivalent construction insofar as they do not depart from the spirit and scope of the portable generator. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
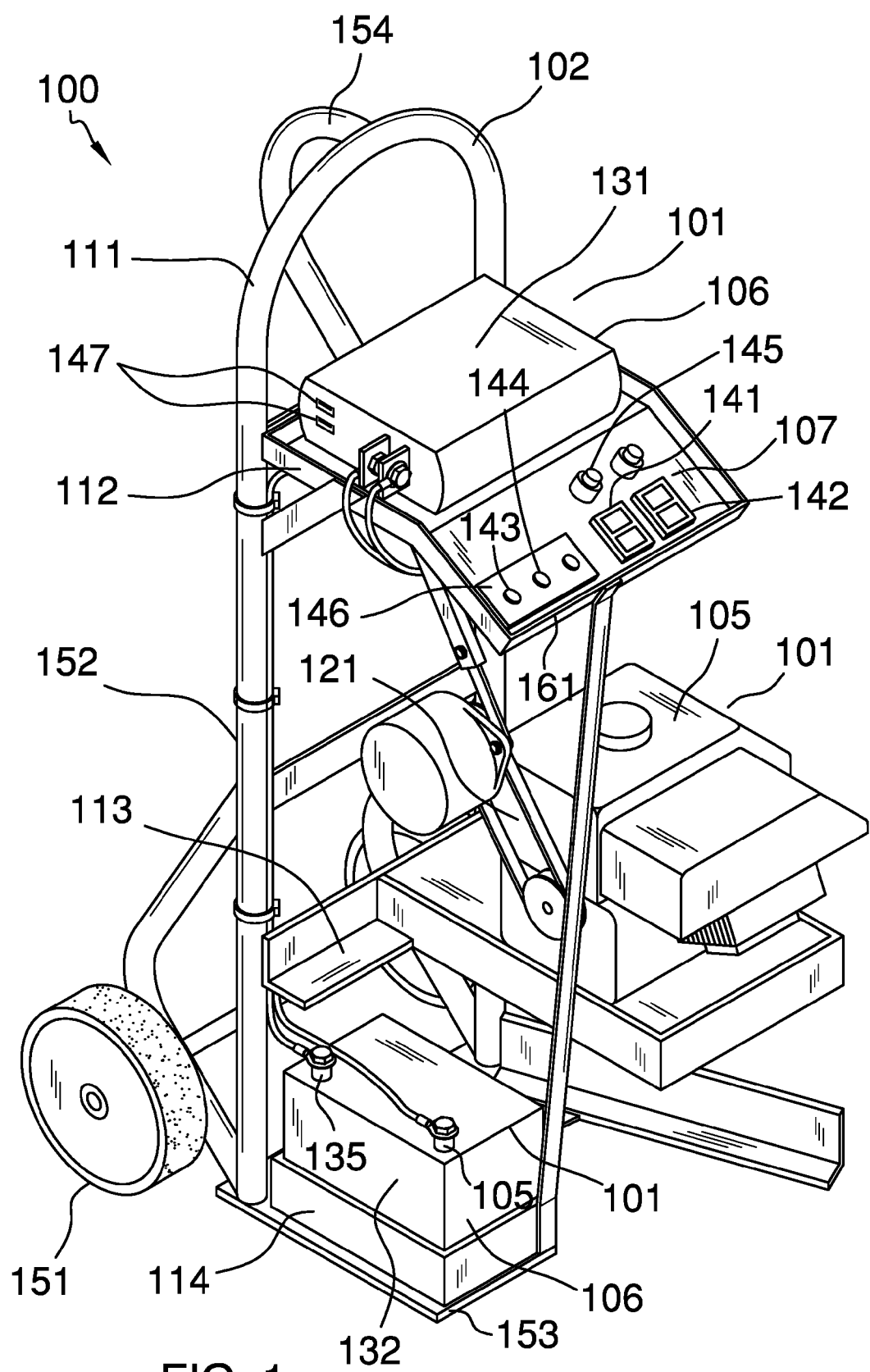
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 4.

The portable generator comprises 100 (hereinafter invention) a portable electricity provisioning system 101 and a dolly 102. The portable electricity provisioning system 101 further comprises an inverter 105, a jump starter 106, and a plurality of ports 107. The invention 100 is a portable electricity provisioning system 101 that is adapted for use in generating electricity. The portable electricity provisioning system 101 is mounted on a dolly 102 that allows the invention 100 to be readily transported to locations where electricity is otherwise not available or is not adequate for the intended use. The invention 100 is configured to provide electricity at 120 Vac, 12 Vdc and 5 Vdc and further comprises adequate energy reserves and connections to provide at least 625 amps at 12 Vdc for use in starting vehicles in maintenance situations.

The dolly 102 comprises a hand truck 111, a distribution tray 112, a charger tray 113 and a battery tray 114. The hand truck 111 is a readily and commercially available standard hand truck (also commonly referred to as a utility hand truck) that is suitable for use in moving cases. It is preferred that the hand truck 111 have pneumatic tires and that hand truck 111 have a minimum load rating of 600 lbs. The hand truck 111 is further defined with a wheel assembly 151, a frame 152, a nose 153, and a handle 154. The frame 152 is a support structure upon which the rest of the components of the hand truck 111 are mounted. The wheel assembly 151 comprises a plurality of wheels that are attached to the frame 152 such that the rotation of the plurality of wheels will move the hand truck 111. The nose 153 is a plate that projects perpendicularly away from the frame 152 such that nose 153 will work in combination with the frame 152 to support items that are being moved using the hand truck 111.

The nose 153 is used to provide a resting surface upon which the load carried by the hand truck 111 is supported.

When a loaded hand truck 111 is placed in a resting position on a level surface, the nose 153 will either: 1) be in contact with the level surface; or, 2) the nose 153 will project perpendicularly away from the level surface. As shown most clearly in FIG. 1, the handle 154 is a grip that is mounted on the end of the frame 152 that is distal from the nose 153. The hand truck has added to it a plurality of trays that are used to support the elements of the portable electricity provisioning system 101. Each of the plurality of trays is a metal plate that is attached to the frame 152 such that each of the plurality of trays creates a surface that is parallel to the resting surface of the nose 153. Each of the plurality of trays are positioned such that each of the plurality of trays is directly above the nose 153 when the nose 153 is in contact with a resting surface. The plurality of trays comprises a distribution tray 112, a charger tray 113, and a battery tray 114. The battery tray 114 is a metal plate that is placed on top of the nose 153. The distribution tray 112 is the tray selected from the plurality of trays that is distal from the battery tray 114. The charger tray 113 is positioned between the distribution tray 112 and the battery tray 114. The battery tray 114 supports a battery 132. The charger tray 113 supports the inverter 105. The distribution tray 112 supports other equipment associated with the jump starter 106 and the plurality of ports 107.

The inverter 105 is a commercially available gasoline powered electric generator 121. The inverter 105 is attached to the charger tray 113 using commercially available hardware. Commercially available hardware is preferred because it allows the inverter 105 to be removed from the dolly 102 for maintenance purposes. The generator 121 is rated to provide 120 Vac with a minimum 1000 watt rating. A generator 121 that is switchable between 120 Vac and 240 Vac with greater than a 3000 watt rating is preferred.

The jump starter 106 stores the electrical energy required to jump start a vehicle. In a first potential embodiment of the disclosure, the jump starter 106 is rated to work with vehicles that operate with 12 Vdc electrical systems. In a second potential embodiment of the disclosure the jump starter 106 is rated to work with nautical vehicles that operate with 24 Vdc electrical systems. In a third potential embodiment of the disclosure, the jump starter 106 is rated to work with scooters that operate with 48 Vdc electrical systems. The jump starter 106 comprises a converter 131, a battery 132, and a jumper cable The converter 131 is a readily and commercially available AC to DC converter that takes the AC voltage from the generator 121 and converts it into a DC voltage at a previously determined level.

The converter 131 is used to charge the battery 132. The battery 132 is a commercially available battery. It is preferred that the battery be rated to provide at least 625 amps during an engine start and have a capacity of greater than 22 amp hours. Greater than 50 amp hours is preferred. The chemical energy stored within the battery 132 is renewed and restored through use of the converter 131. The converter 131 provides and powers an electrical circuit that reverses the polarity of the battery 132 and provides the energy necessary to reverse the chemical processes that the battery 132 initially used to generate electrical energy. This reversal of the chemical process creates a chemical potential energy that will later be used to generate electricity. The battery 132 is further defined with a plurality of battery posts 135 which are also commonly referred to as the anode and cathode. The plurality of battery posts 135 provide the electrical connection points required to: 1) connect the battery 132 to an external battery that needs power; 2) connect the battery 132 to the cigarette lighter socket 145; and, 3) connect the battery 132 to the converter 131. The cigarette lighter socket 145 is discussed elsewhere in this disclosure.

The jump starter 106 is further provisioned with a jumper cable that connects the plurality of battery posts 135 to the DC electrical system of the vehicle. Optionally, the jump starter 106 can further comprise a quick connect termination The quick connect termination is a commercially available quick connect plug kit that is specifically designed for use with jumper cables and batteries 132 to provide a plug and port connection that allow for the convenient and reliable connection and disconnection of the jumper cable to the battery 132.

The plurality of ports 107 are a collection of terminations that are designed to provide electrical power. The plurality of ports 107 comprises a first NEMA 5-15 electrical socket 141, a second NEMA 5-15 electrical socket 142, a first USB port 143, a second USB port 144, and a cigarette lighter socket 145. The plurality of ports 107 further comprises a housing 161. The housing 161 is a rigid container that contains the electrical connections from the generator 121, converter 131, and battery 132 to one or more ports 146 selected from plurality of ports such that: 1) the one or more ports 146 are mounted to the housing such that the one or more ports are accessible for use; and 2) inadvertent access to the electrical connections from the generator 121, converter 131, and battery 132 to the one or more ports 146 is prevented. A voltmeter 148 is also mounted on the housing 161. It is the intention of the inventor that primary access to electricity provided by the invention is through the one or more ports 146, but it is recognized that in some circumstances access to electric power through additional ports 147 provided on the generator 121, converter 131, or battery 132 may be desirable. To accommodate this desirable outcome within this disclosure, it is presumed that the plurality of ports 107 comprises both the one or more ports 146 and the additional ports 147 discussed above.

The first NEMA 5-15 electrical socket 141 is a commercially available port that is commonly used to provide up to 15 amps of 120 Vac electric power to electrical devices. The second NEMA 5-15 electrical socket 142 is a commercially available port that is commonly used to provide up to 15 amps of 120 Vac electric power to electrical devices. The first USB port 143 is a commercially available port that is commonly used to provide up to 3.0 amps of 120 Vac electric power to electrical devices. The second USB port 144 is a commercially available port that is commonly used to provide up to 3.0 amps of 5 Vdc electric power to electrical devices. The cigarette lighter socket 145 is a commercially available port that is commonly used to provide up to 15.0 amps of 12 Vdc electric power to electrical devices.

Figure 2:
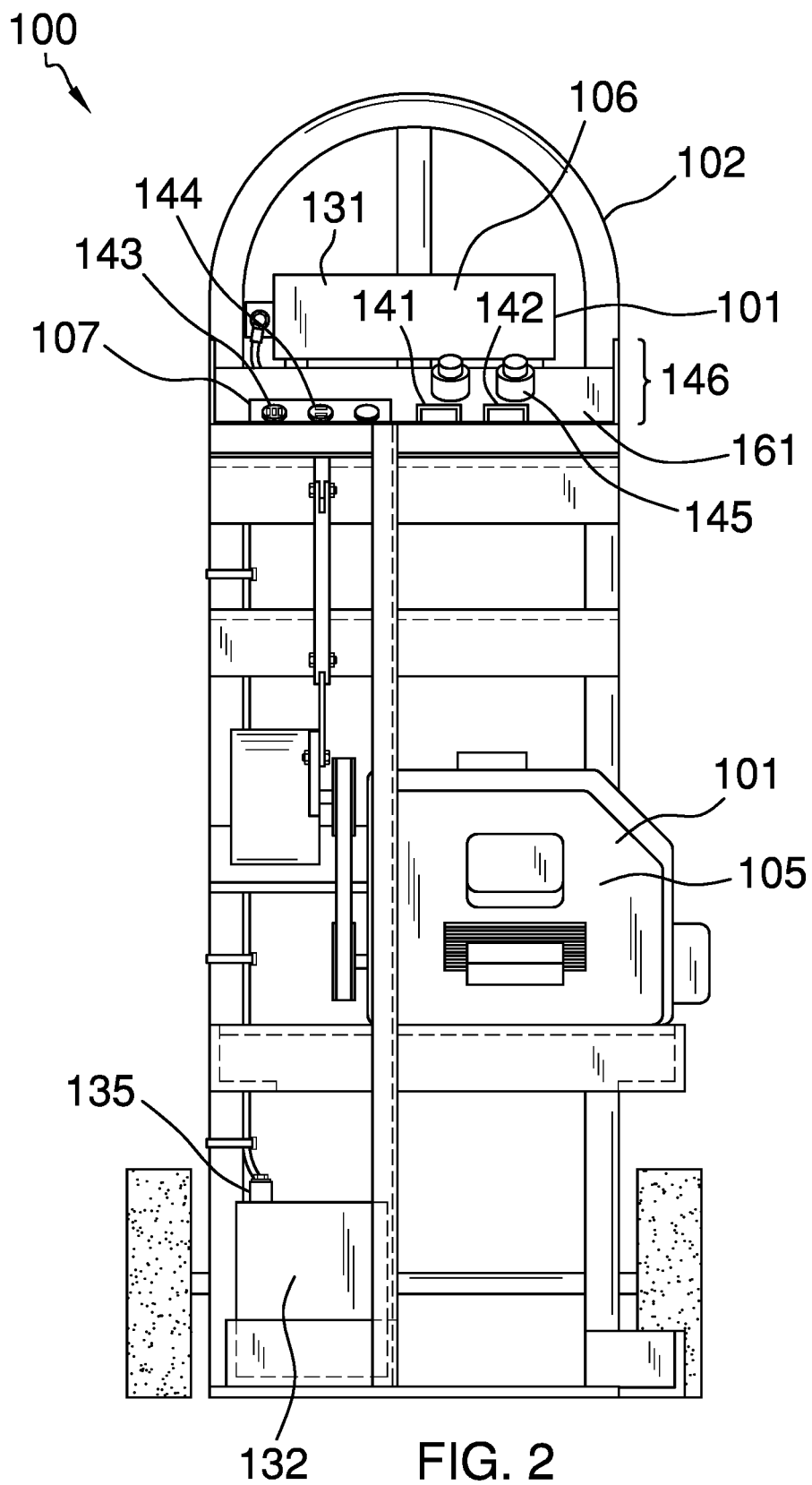
FIG. 2 is a front view of an embodiment of the disclosure.
Figure 3:
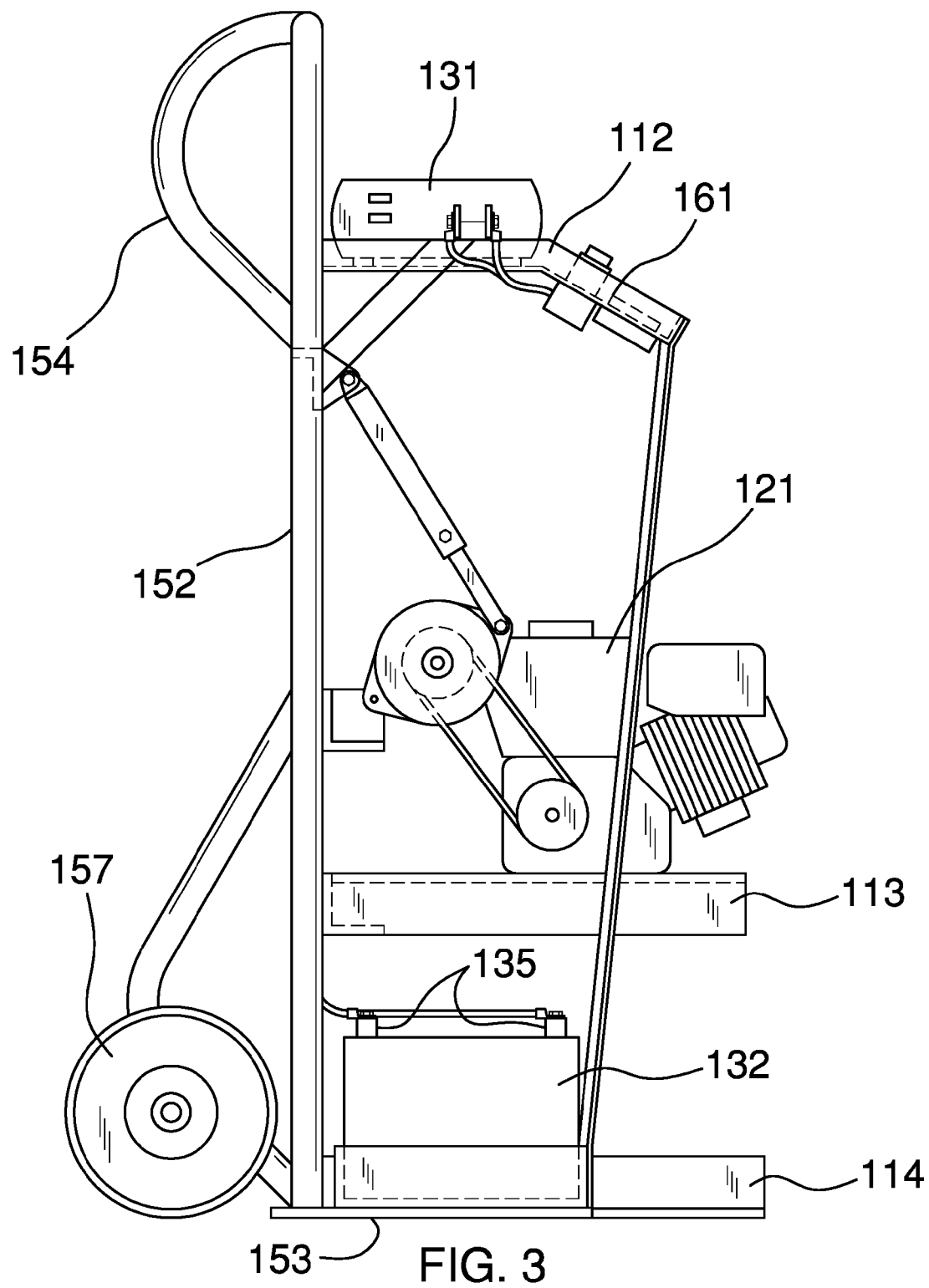
FIG. 3 is a side view of an embodiment of the disclosure.
Figure 4:
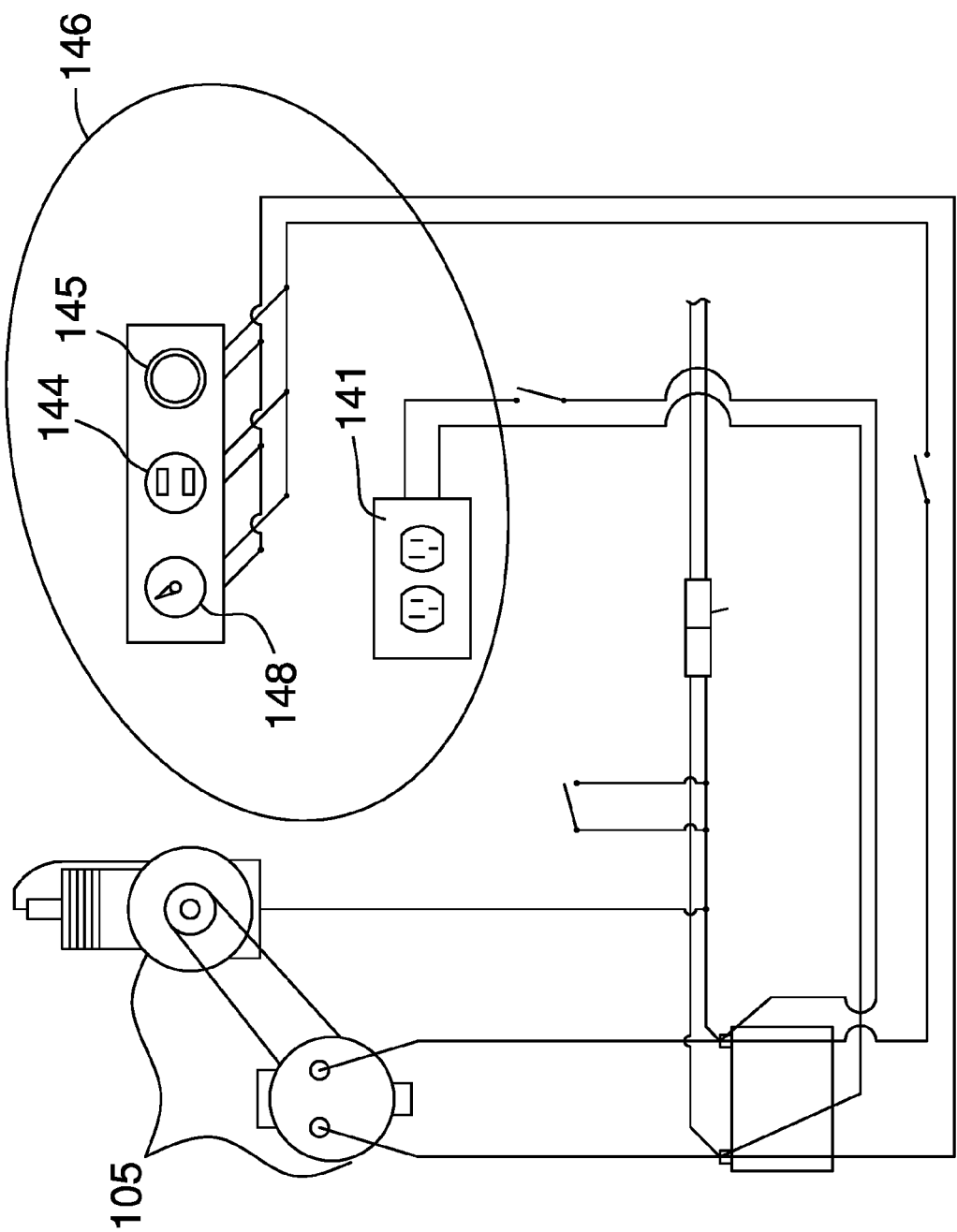
FIG. 4 is a wiring diagram of an embodiment of the disclosure.

In a fourth potential embodiment of the disclosure, as shown most clearly in FIGS. 1 and 2, the invention 100 is assembled as follows. The battery 132 is placed on the battery tray 114 and is secured into position using commercially and commonly available hardware. The generator 121 is placed on charger tray 113 and is secured into position using commercially and commonly available hardware. The converter 131 is placed on the distribution tray 112 and is secured into position using commercially and commonly available hardware. The housing 161 is placed on the distribution tray 112 adjacent to the converter 131 and is secured into position using commercially and commonly available hardware. The first NEMA 5-15 electrical socket 141 is mounted in the housing 161. The second NEMA 5-15 electrical socket 142 is mounted in the housing 161. The first USB port 143 is mounted in the housing 161. The second USB port 144 is mounted in the housing 161. The cigarette lighter socket 145 is mounted in the housing 161.

To use the invention 100, the invention 100 is brought to the location where it is to be used. The generator 121 is then started and the plurality of ports 107 can be used normally. The generator 121 does not need to be operating to use the jump starter or to draw electric power from the cigarette lighter socket 145.

The following definitions were used in this disclosure:

AC: As used in this disclosure, AC is an acronym for alternating current.

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Battery: As used in this disclosure, a battery is a container consisting of one or more cells, in which chemical energy is converted into electricity and used as a source of power.

Cable: As used in this disclosure, a cable is a collection of insulated wires covered by a protective casing that is used for transmitting electricity or telecommunication signals.

DC: As used in this disclosure, DC is an acronym for direct current.

Generator: In this disclosure, a generator is a machine that converts rotational mechanical energy into electric energy.

Housing: As used in this disclosure, a housing is a rigid casing that encloses and protects one or more devices.

NEMA 5-15 Electrical Socket: As used in this disclosure, the NEMA 5-15 electrical socket is a port designed to provide electric power drawn from the National Electric Grid. The NEMA 5-15 electrical socket is commonly used to deliver electrical power to electric devices in residential, office, and light industrial settings. The typical NEMA5-15 electrical socket comprises a plurality of electric ports from which electric power is drawn. The position of each of the plurality of electric ports is placed in a standardized position. The typical NEMA5-15 electrical socket further comprises a plate hole which is a standardized hole located in a standardized position within the NEMA 5-15 electrical socket that that is designed to receive a bolt that is used to attach a faceplate to the NEMA 5-15 electrical socket. The NEMA 5-15 electrical socket is also commonly referred to as an electrical outlet.

Plate: As used in this disclosure, a plate is a smooth, flat and rigid object that has at least one dimension that: 1) is of uniform thickness; and 2) that appears thin relative to the other dimensions of the object. Plates often have a rectangular or disk like appearance. As defined in this disclosure, a plate will be made of metal.

Plug: As used in this disclosure, a plug is a device at the end of an electrical cord that connects a cable to an electrical device or a source of electricity.

Port: As used in this disclosure, a port is an electrical termination that is used to connect a first electrical circuit to a second external electrical circuit. In this disclosure, the port is designed to receive a plug.

Socket: As used in this disclosure, a socket synonym for a port.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

Wheel: As used in this disclosure, a wheel is a circular object that revolves around an axle or an axis and is fixed below an object to enable it to move easily over the ground.

Vac: As used in this disclosure, Vac is an abbreviation for alternating current voltage.

Vdc: As used in this disclosure, Vdc is an abbreviation for direct current voltage.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portable electricity provisioning system comprising:
an inverter, a jump starter, a plurality of ports, and a dolly;
wherein the portable electricity provisioning system is adapted for use in generating electricity;
wherein the inverter is mounted on the dolly;
wherein the jump starter is mounted on the dolly;
wherein the plurality of ports are mounted on the dolly;
wherein the inverter is connected to a DC electric generator;
wherein the inverter provides at electric voltages of at least 120 Vac with at least a minimum maximum load capacity of 1000 watts;
wherein the jump starter stores chemical energy in a form that can be converted into electrical energy;
wherein the jump starter comprises a converter and a battery;
wherein the converter draws electrical energy from the generator and converts it to electrical energy in the battery;
wherein the converter is an AC to DC converter that takes the AC voltage from the generator and converts it into a DC voltage at a previously determined level;
wherein the battery is rated to provide at least 625 amps;
wherein the battery has a capacity of greater than 22 amp hours;
wherein the battery is further defined with a plurality of battery posts;
wherein the battery posts are used to connect the battery to the converter;
wherein the plurality of ports comprises a first NEMA 5-15 electrical socket, a second NEMA 5-15 electrical socket, a first USB port, a second USB port, a cigarette lighter socket, and a housing;
wherein the housing is a rigid container;
wherein the first NEMA 5-15 electrical socket is mounted on the housing;
wherein the a second NEMA 5-15 electrical socket is mounted on the housing;
wherein the first USB port is mounted on the housing;
wherein the second USB port is mounted on the housing;
wherein the cigarette lighter socket is mounted on the housing.

2. The portable electricity provisioning system according to claim 1 wherein the jump starter is rated to work with vehicles that operate with electrical systems that operate at voltages selected from the group consisting of 12 Vdc, 24 Vdc, or 48 Vdc.

3. The portable electricity provisioning system according to claim 1
wherein the portable electricity provisioning system further comprises a voltmeter;
wherein the voltmeter is mounted on the housing.

4. The portable electricity provisioning system according to claim 3 wherein the inverter further comprises a maximum load capacity of 3000 watts.

5. The portable electricity provisioning system according to claim 3
wherein the dolly comprises a hand truck, a distribution tray, a charger tray and a battery tray;
wherein the distribution tray, the charger tray, and the battery tray are attached to the dolly.

6. The portable electricity provisioning system according to claim 5
wherein the hand truck is further defined with a wheel assembly, a frame, a nose, and a handle;
wherein the wheel assembly, the nose, and the handle are attached to the frame;
wherein the distribution tray is a metal plate;
wherein the charger tray is a metal plate;
wherein the battery tray is a metal plate;
wherein the distribution tray is attached to the frame such that the distribution tray creates a surface that is parallel to the surface of the nose;
wherein the charger tray is attached to the frame such that the distribution tray creates a surface that is parallel to the surface of the nose;
wherein the battery tray is attached to the frame such that the distribution tray creates a surface that is parallel to the surface of the nose;
wherein the distribution tray is positioned directly over the nose when the nose is in contact with the surface the hand truck is resting on;
wherein the charger tray is positioned directly over the nose when the nose is in contact with the surface the hand truck is resting on;
wherein the battery tray is positioned directly over the nose when the nose is in contact with the surface the hand truck is resting on.

7. The portable electricity provisioning system according to claim 6 wherein the cigarette lighter socket is connected to the battery posts.

8. The portable electricity provisioning system according to claim 7
wherein the battery is secured to the battery tray;
wherein the generator is secured to charger tray;
wherein the converter is secured to the distribution tray;
wherein the housing is secured to the distribution tray.

9. The portable electricity provisioning system according to claim 1
wherein the dolly comprises a hand truck, a distribution tray, a charger tray and a battery tray;
wherein the distribution tray, the charger tray, and the battery tray are attached to the dolly;
wherein the hand truck is further defined with a wheel assembly, a frame, a nose, and a handle;
wherein the wheel assembly, the nose, and the handle are attached to the frame;
wherein the distribution tray is a metal plate;
wherein the charger tray is a metal plate;
wherein the battery tray is a metal plate;
wherein the distribution tray is attached to the frame such that the distribution tray creates a surface that is parallel to the surface of the nose;
wherein the charger tray is attached to the frame such that the distribution tray creates a surface that is parallel to the surface of the nose;
wherein the battery tray is attached to the frame such that the distribution tray creates a surface that is parallel to the surface of the nose;
wherein the distribution tray is positioned directly over the nose when the nose is in contact with the surface the hand truck is resting on;
wherein the charger tray is positioned directly over the nose when the nose is in contact with the surface the hand truck is resting on;
wherein the battery tray is positioned directly over the nose when the nose is in contact with the surface the hand truck is resting on.

10. The portable electricity provisioning system according to claim 9
wherein the inverter is an electric generator;
wherein the inverter provides at electric voltages of at least 120 Vac with at least a minimum maximum load capacity of 1000 watts;
wherein the jump starter stores chemical energy in a form that can be converted into electrical energy;
wherein the jump starter comprises a converter and a battery;
wherein the converter draws electrical energy from the generator and converts it to electrical energy in the battery;
wherein the converter is an AC to DC converter that takes the AC voltage from the generator and converts it into a DC voltage at a previously determined level.

11. The portable electricity provisioning system according to claim 10
wherein the plurality of ports comprises a first NEMA 5-15 electrical socket, a second NEMA 5-15 electrical socket, a first USB port, a second USB port, a cigarette lighter socket, and a housing;
wherein the housing is a rigid container;
wherein the first NEMA 5-15 electrical socket is mounted on the housing;
wherein the a second NEMA 5-15 electrical socket is mounted on the housing;
wherein the first USB port is mounted on the housing;
wherein the second USB port is mounted on the housing;
wherein the cigarette lighter socket is mounted on the housing;
wherein the portable electricity provisioning system further comprises a voltmeter;
wherein the voltmeter is mounted on the housing.

12. The portable electricity provisioning system according to claim 11 wherein the battery is secured to the battery tray;
wherein the generator is secured to charger tray;
wherein the converter is secured to the distribution tray;
wherein the housing is secured to the distribution tray.

* * * * *